United States Patent
Konzet et al.

(10) Patent No.: US 8,997,444 B2
(45) Date of Patent: Apr. 7, 2015

(54) SEAT SUPPORT DEVICE FOR A RIDING ANIMAL OR A PACK ANIMAL

(71) Applicant: dt saddlery GmbH design & technik, Weyarn (DE)

(72) Inventors: Hjalmar Konzet, Weyarn (DE); Claudia Gentilini, Weyarn (DE)

(73) Assignee: dt saddlery GmbH design & technik, Weyarn (DE)

( * ) Notice: Subject to any disclaimer, the term of this patent is extended or adjusted under 35 U.S.C. 154(b) by 147 days.

(21) Appl. No.: 13/769,290

(22) Filed: Mar. 26, 2013

(65) Prior Publication Data
US 2013/0269300 A1 Oct. 17, 2013

(30) Foreign Application Priority Data

Apr. 13, 2012 (DE) .......................... 10 2012 103 250

(51) Int. Cl.
*B68C 1/04* (2006.01)
*B68C 1/02* (2006.01)

(52) U.S. Cl.
CPC . *B68C 1/025* (2013.01); *B68C 1/04* (2013.01); *B68C 2001/042* (2013.01)

(58) Field of Classification Search
USPC ...................... 54/40.1, 44.5, 46.1, 46.2, 44.1; D30/134, 135
See application file for complete search history.

(56) References Cited

U.S. PATENT DOCUMENTS

| 821,135 | A | | 5/1906 | Szameitat | |
|---|---|---|---|---|---|
| 3,716,965 | A | | 2/1973 | Douglas | |
| 5,884,459 | A | * | 3/1999 | Biddlecome | 54/44.1 |
| 6,363,698 | B1 | * | 4/2002 | Swain | 54/44.5 |
| 7,918,075 | B2 | * | 4/2011 | James | 54/46.2 |
| 2008/0086988 | A1 | * | 4/2008 | Ruiz Diaz | 54/44.3 |
| 2009/0217629 | A1 | | 9/2009 | Kroetch | |

FOREIGN PATENT DOCUMENTS

| EP | 2159187 A1 | 3/2010 |
|---|---|---|
| EP | 2275382 | 1/2011 |
| GB | 2423230 | 8/2006 |

* cited by examiner

*Primary Examiner* — Rob Swiatek
*Assistant Examiner* — Magdalena Topolski
(74) *Attorney, Agent, or Firm* — Smartpat PLC; Axel Nix (57) ABSTRACT

A seat support device for a riding animal or a pack animal, a saddle tree, and a saddle with such a saddle tree. The seat support device comprises a right multi-linked lug arrangement with a first link section and at least a second link section and a left multi-linked lug arrangement with a first link section and at least a second link section. A pivoting device with a pivot axis is each formed case between two adjacent link sections, so that two adjacent link sections are pivotable towards one other around a pivot axis substantially within a pivot plane which penetrates the pivot axis substantially perpendicular.

20 Claims, 9 Drawing Sheets

Fig. 1

Prior Art

SEAT SUPPORT DEVICE FOR A RIDING ANIMAL OR A PACK ANIMAL

TECHNICAL FIELD

The present disclosure relates to a seat support device for a riding animal or a pack animal, a saddle tree and a saddle with saddle tree.

BACKGROUND

Different types of saddles such as all-purpose saddles, dressage saddles and jumping saddles are used in equestrian sports, particularly in the English equestrian sports. An all-purpose saddle is a compromise of a jumping saddle and a dressage saddle, whose twist, i.e. lowest point, is substantially in the middle of the seat. The twist of the dressage saddle is also substantially in the middle of the seat, whereas the twist of the jumping saddle is a bit behind the middle of the seat.

The construction of saddles for riding animals has been virtually unchanged in the course of time. The most original form is the Bock saddle which was used as a transport saddle, load saddle or pack saddle. It was made of two shelves which were butted against the animal body on the left side and right side and connected together at the front and the back by means of girths. The Bock saddle has been padded with cushions and blankets in order to use it as a riding saddle. Since the 18th century, a saddle tree is used which serves as a support or frame for a saddle for sitting on the back of a riding animal or pack animal, such as horses, ponies or donkeys.

EP 2 159 187 A1 describes an exemplary saddle tree having a supporting side for applying to a back of a riding animal or pack animal, a top side facing away from the supporting side, a gullet for forming the gullet width of the saddle and a gullet plate for stabilizing the gullet running transverse to the length of the saddle tree along the gullet wherein the gullet plate is arranged at the top side. The material of the gullet plate has to meet high strength requirements as it is subject to high mechanical loads.

In order to achieve a great accuracy of fit of a saddle tree or a saddle, the saddle tree is being adapted as optimally as possible to the back of the riding animal or pack animal which shall be saddled, particularly to the form of its withers, the musculature of the animal, the animal variety, congenital abnormality, etc., taking into account the physical constitution of the rider, particularly the size and weight. Different styles of riding or purposes also require individual designed saddle trees in order to prevent or minimize harm to health of the rider and of the riding animal or pack animal.

In practice, saddle trees are offered in a large number of different sizes and different gullet widths. The gullet width of the saddle tree can be modified by adapting or replacing the gullet plate. The adaptation can be performed by bending up, respectively widening, or compressing, respectively narrowing, the gullet plate. The specialist or saddler usually uses an adjusting device to adjust the gullet plate. It is particularly costly in terms of labor and time-consuming to adapt or replace the gullet plate. Afterwards, the cushions of the saddle have to be adapted in many cases. The rigid and inflexible fork construction of the saddle head and of the gullet plate provide a secure hold for the rider only if there is an optimal fit of the saddle tree or saddle on the back of an animal.

In case that the saddle tree is made from a solid material, for example wood, the saddle tree has a saddle head made of a stable, rigid, and solid material and the adaption of the saddle tree to the horse back is achieved by adding or removal of saddle tree material, which is time consuming and costly.

A saddle tree or a saddle which does not fit or does wrongly sit may hinder the motion of the animal or injure the animal while riding. Furthermore, the saddle is not sufficiently fixed on the animal back whereby the rider is not able to establish an optimal connection to the animal and the saddle may slip.

In the equestrian field a rider usually purchases a custom-made saddle for each riding animal. This accounts for the fact that riding animals have a different anatomical physique particularly in the area of the saddle support. Riding animals such as horses often have an asymmetry which is commonly known as the good and the bad hand. The asymmetry of the riding animal can be, for example, birth-related, inherited or acquired. The birth-related asymmetry is generally the result of a lack of physical activity directly after the birth of the riding animal. The acquired asymmetry is often caused by insufficient exercise of the riding animal during the rearing phase or by injuries and afterwards a prolonged relieving posture. An asymmetry caused by riding may further occur due to a missing or incorrect gymnastic development of the riding animal or pack animal. The term gymnastic development refers to the work with a riding animal on the basis of scientific knowledge of the anatomy, physiology and psychology of the animal.

Different measuring systems are used to measure the back of the riding animal or pack animal particularly the area of the saddle support. The saddlers particularly determine the form of the trapezius to the left and right of the withers of the riding animal or pack animal, the shape of the back muscles particularly on the left and right of the spinal process, and the backrest form of the riding animal and pack animal i.e. whether the back is straight or curved. Furthermore, both the shoulder sections and gullet width of the riding animal or pack animal are measured. This procedure has the disadvantage that the individual manufactured saddle tree and saddle with such a saddle tree is suitable only for a specific riding animal or pack animal and in the event of a change of the anatomic shape of the back the costly made tailored saddle does not fit any more.

There is a need for the rider at the moment that a check and examination has to be carried out when a new saddle for a particular riding animal or pack animal is purchased and also afterwards in regular intervals to determine whether the saddle fits as optimally as possible on the back of the riding animal or pack animal. In practice, an adaptation of the saddle tree or the saddle must be carried out in case of a change of weight, musculature or age of the riding animal or pack animal.

The object of the present disclosure is therefore to provide a seat support device suitable for a riding animal or a pack animal, a saddle tree and a saddle with such a saddle tree for a riding animal or a pack animal which enables a variety of industrial applications, which can be used on differently shaped back areas and withers without restricting or impeding the freedom of movement of the riding animal or pack animal, which enables a secure fixation of the saddle on the back of the riding animal or pack animal without producing partial pressure points, which provides an improved distribution of the forces acting on the riding animal or pack animal and with which the disadvantages of the state of the art can be overcome.

SUMMARY

The present disclosure provides a seat support device for a riding animal or pack animal according to independent claim 1, a saddle tree comprising the seat support device, and a saddle comprising the saddle tree with the seat support device. Preferred embodiments are disclosed in the dependent claims.

The seat support device for a riding animal or pack animal comprises a right multi-linked lug arrangement with a first link section and at least a second link section and a left multi-linked lug arrangement with a first link section and at least a second link section. A pivoting device with a pivot axis is formed each between two adjacent link sections. Two adjacent link sections are pivotable towards one other around the pivot axis substantially within a pivot plane which penetrates the pivot axis substantially perpendicular.

The term "substantially perpendicular" preferably comprises a taper angle range of 20°. The link sections of the multi-linked lug arrangements each have a defined length. The left multi-linked lug arrangement is located on the left side of the withers and the right multi-linked lug arrangement is located on the right side of the withers of the riding animal or pack animal, when viewed from the tail to the head of the riding animal or pack animal. The term "longitudinal direction" or "lengthwise" means substantially parallel to the spinal column of a riding animal or pack animal, i.e. in the direction of the head to the tail, and the term "transverse direction" or "transversely" means substantially transverse to the spinal column or body length of a riding animal or pack animal. Riding animals or pack animals include all animals that are ridden by people or that may transport goods. These include in particular horses, ponies or donkeys.

The disclosed seat support device may be mounted to a seat on a riding animal or pack animal. The seat support device can be used for riding animals and pack animals with different anatomical back shape. The disclosed seat support device ensures that the spinal column and the withers as well as the trapezius muscle of the respective riding animal or pack animal are kept free from load. The seat support device is usable independently of the anatomical shape of the back of the riding animal or pack animal. The seat support device does not comprise a saddle head and/or a gullet plate so that a subsequently adaption or adjustment of the saddle head and/or gullet plate is no longer necessary. In particular in case of a change of the weight, the musculature, or the age of the riding animal or pack animal, it is no longer necessary to widen or to narrow the gullet plate, which has been time-consuming and labor-intensive. A saddle head or a gullet plate is not required due to the novel construction. The flexible structure and configuration of the device also enables a usage when the riding animal or pack animal is sensitive, or it is already injured or it is exterior unusual.

The disclosed seat support device can be used for different embodiments of the seat or the load support surface for the rider and for a plurality of saddles such as jumping saddles, dressage saddles, all-purpose saddles, Western saddles, dress saddles, gaited horses saddles, trail saddles, endurance saddles, side saddles, English saddles, Iberian saddles, Spanish saddles, load saddles or pack saddles.

The disclosed seat support device, saddle tree and saddle with such a saddle tree can be used without measuring the back of the riding animal or pack animal, and without individual adaptation. The disclosed seat support device can be used for various riding animals or pack animals which have different back structures, withers, asymmetries or musculatures.

Another advantage of the disclosed seat support device is that its construction does not strain the withers of the riding animal or pack animal and the withers is freely movable. The withers is a very sensitive and injury-prone part of the body of the riding animal or pack animal. The embodiments of the prior art comprising a saddle head and/or a gullet plate have particularly the disadvantage that the withers regarded as very important for the balance and the secure support of the saddle can be injured and that the trapezius muscle which is incorrectly stressed by an incorrect fitted saddle can atrophy when it is exposed to high and extended pressure loads. Furthermore, a saddle head and/or gullet plate hinder a feedback so that the rider does not obtain a response about the stress condition or information about any anxiety or worry of the riding animal. Such a feedback enables, however, the perception of injuries or damages of the riding animal. The removal of the saddle head and/or gullet plate, which are not required for the balance or the sitting comfort of the rider, allows that the rider obtains a feedback from the riding animal and a direct influence and force transmission from the rider to the back musculature of the animal is possible particularly through the seat. The communication between the rider and the riding animal or pack animal is particularly improved. The rider is able to pass on commands to the riding animal or pack animal by shifting of weight or transference of force by legs. Furthermore, the rider can earlier perceive stress conditions of the riding animal or pack animal. Moreover, the hindquarters activity can be improved both during the training of young riding animals or pack animals and during the riding of well-trained horses.

The disclosed saddle tree can be applied to the back of a riding animal or pack animal and it is attachable to the riding animal or pack animal. A saddle tree for riding animals and pack animals is provided which comprises a seat having a front area facing towards the head of the riding animal or pack animal, a back area, and two side areas, and a disclosed device attachable to the saddle tree. The right multi-linked lug arrangement and the left multi-linked lug arrangement are attachable to the saddle tree. A pivoting device with a pivot axis is formed between two adjacent link sections, wherein the two adjacent link sections are pivotable towards one other around the pivot axis substantially within a pivot plane which penetrates the pivot axis substantially perpendicular. The term "substantially perpendicular" preferably comprises a taper angle range of 20°.

The disclosed saddle for applying to a back of a riding animal or pack animal comprises the disclosed seat support device and at least one cushion element attached to the bottom side of the seat. In a preferred embodiment, the saddle further comprises a saddle tree.

It is an advantage that the disclosed saddle does not affect the mobility of the scapulae and the related musculature and tendon bases of the riding animals or pack animals. The movable multi-linked lug arrangements of the seat support device particularly adapt to the body shapes of the riding animals both while standing and riding. The fixation of the device, the saddle tree or the saddle behind the scapulae of the respective riding animal or pack animal is preferably carried out flexible by means of a belt fasting device. The fixation is also ensured by the adjustment of the individual pivoting elements between the individual link sections of the multi-linked lug arrangements which beside the degree of freedom retains a rigid adjustment of the adjacent link sections substantially within their respective pivot plane. The device, the saddle tree and the saddle can be used for different breed of horses and for different formed back shapes of riding animals and pack animals.

In a preferred embodiment, the pivoting device is formed such that it generates only a possible small motion-dependent and/or angular dependent counter-torque. In a further preferred embodiment, the pivoting device has a counter-torque which is defined and acts proportional to the relative motion of the link sections which are adjacent to the pivoting device. Such a counter-torque is produced, for example, by internal friction of the pivoting element or by application of a friction element which damp the motion of the link elements.

In a further preferred embodiment, the pivoting device has a counter-torque which is defined and acts proportional to the angle between the link sections which are adjacent to the pivoting device. Such a counter-torque is producible, for example, by a spring element which exerts a torque to the link elements in order to bring it back in a starting position. Such a spring element can comprise, for example, the material of the pivoting device itself or an additionally attachable component with a defined spring constant.

In a preferred embodiment, the right multi-linked lug arrangement comprises a first link section and a second link section. The left multi-linked lug arrangement also comprises a first link section and a second link section, wherein a pivoting device with a pivot axis is formed each between two adjacent link sections. The two adjacent link sections are pivotable towards one other around the pivot axis substantially within a pivot plane which penetrates the pivot axis substantially perpendicular. This configuration of the pivoting devices enables that the multi-linked lug arrangements can be pivoted respectively in one direction. Each pivoting device provides a degree of freedom which is defined by the position of the pivot plane in space. The term "substantially perpendicular" preferably comprises a taper angle range of 20°.

In a particularly preferred embodiment, the right multi-linked lug arrangement comprises a third link section and the left multi-linked lug arrangement comprises as third link section, wherein another pivoting device with a pivot axis is formed between each second and third adjacent link section, the two adjacent link sections being pivotable towards one other around the pivot axis substantially within a pivot plane which penetrates the pivot axis substantially perpendicular. The term "substantially perpendicular" preferably comprises a taper angle range of 20°. This configuration of the pivoting devices enables a pivoting of the multi-linked lug arrangements both substantially in longitudinal direction and substantially in transverse direction. Preferably, the pivoting devices absorb the loads of the movable parts and the three-dimensional force components and torsion components of the movements. Each pivoting device provides a degree of freedom.

In a further preferred embodiment, the right multi-linked lug arrangement has a further link section and the left multi-linked lug arrangement has a further link section, wherein another pivoting device with a pivot axis is formed each between two adjacent link sections, the two adjacent link sections being pivotable towards one other around the pivot axis substantially within a pivot plane which penetrates the pivot axis substantially perpendicular. The term "substantially perpendicular" preferably comprises a taper angle range of 20°. The articulated configuration of the multi-linked lug arrangements enables an optimal adaption or alignment of the device to the body shape or back structure of the riding animal or pack animal. A rider is able to establish a close contact to the animal as there is an optimal adaption of the device to the back of the riding animal or pack animal. The link sections of the multi-linked lug arrangements which are formed behind the scapulae of the riding animal or pack animal and which have the same or different length enable unhindered movements of the musculature of the riding animal or pack animal whereby the efficiency can be increased and health impairments can be prevented.

Advantageously the second link section and the third link section of the left multi-linked lug arrangement include an angle range between 60° and 130°, particularly between 70° and 120°, preferably between 80° and 110°, and the second link section and the third link section of the right multi-linked lug arrangement include an angle range between 60° and 130°, particularly between 70° and 120°, preferably between 80° and 110°. A pivoting of the link sections is provided by the angled construction both substantially in longitudinal direction and substantially in transverse direction. The angled lug arrangements enclose the body of the riding animal or pack animal without casing or performing partial pressure points or small load areas.

It is preferred that the last link section of the right multi-linked lug arrangement and the last link section of the left multi-linked lug arrangement comprise free ends. The free ends are movable and pivotable in a large angle range, for example of 350°.

In a preferred embodiment, the first link section of the right multi-linked lug arrangement and the first link section of the left multi-linked lug arrangement extend in each case at least partly to the back area of the seat. In that case, the respective first link sections of the lug arrangements form longitudinal struts. The longitudinal struts are preferably made of a moldable material and are formed substantially in the side areas of the seat.

Advantageously, the seat support device and/or the saddle tree comprise fiber-reinforced plastics, particularly carbon-fiber-reinforced plastics. Fiber-reinforced plastic means a material which comprises reinforcing fibers and a polymer matrix. The matrix encloses the fibers which are bonded to the matrix by adhesive power or cohesive power. Carbon-fiber-reinforced plastic means a fiber-plastic composite material in which the carbon fibers, particularly in several layers, are embedded in the polymer matrix as reinforcement. The use of fiber material has the consequence that the fiber-plastic-composites have a directional elasticity behavior. Fiber-plastic-composites particularly have high specific stiffness and strength.

In a preferred embodiment, at least one connection element or connection strut is formed between the first link section of the left multi-linked lug arrangement and the first link section of the right multi-linked lug arrangement. The connection strut particularly has a curve or a bend which substantially has the shape of the horseback. An improved fixation of the respective link sections of the lug arrangements in transverse direction can be provided by the at least one connection strut with the consequence that the seat support device and/or the saddle tree can withstand higher forces and loads which particularly occur during fast movements of the riding animal or pack animal or jumping activities. In a further preferred embodiment, two connection elements are formed between the first link section of the left multi-linked lug arrangement and the first link section of the right multi-linked lug arrangement.

Advantageously, each pivoting device comprises a hinge or a joint. Each pivoting device, however, can also comprise an integral hinge, i.e. it can be formed by means of tapering of material or by individual formed connection struts. An integral hinge is characterized by the fact that two elements which shall be connected together are formed in one-piece. The integral hinges substantially comprise a material tapered or thin-walled connection or a connection having individual material struts which enables a rotation of the connected parts substantially within a defined pivot plane by means of their ductility.

The hinge must be able to absorb the load of the movable parts in particular the link sections of the lug arrangements and the forces of movement wherein it serves as a bearing having a degree of freedom substantially within a defined pivot plane. The expert recognizes that the at least one pivoting device is formed from a flexible connection such as elastic or non-elastic bands, laced wire ropes particularly steel ropes or other connections which are free movable within the pivot plane and which are stable and formed transverse to the pivot plane. Therefore, the pivoting device may be formed from, for example, a partly-flexible tissue element particularly fabric-reinforced elastic bands, non-metallic straps, leather tapes, synthetic bands or band-like or cord-like connections made from any other material.

In a preferred embodiment, one link section preferably the second link section of the right multi-linked lug arrangement comprises a first stirrup belt holder and one link section preferably the second link section of the left multi-linked lug arrangement comprises a second stirrup belt holder. The relevant individual link sections of the lug arrangements form the stirrup belt holders and can be manufactured in one piece. Thus, costs and material can be saved and a compact and secure construction can be provided.

In a further preferred embodiment, a first stirrup belt holder is attached to the right multi-linked lug arrangement and a second stirrup belt holder is attached to the left multi-linked lug arrangement by fastening means. In that case the possibility is given that different formed stirrup belt holders can be attached and they are replaceable. The attachment of the stirrup belt holders can be achieved by fastening means such as screws, rivets and/or adhesives.

A recess is preferably formed in the front area of the seat in order to improve the movability of the back musculature and to provide a protection to the back of the riding animal or pack animal. The recess or cavity is formed in the front area of the seat.

The right multi-linked lug arrangement and left multi-linked lug arrangement may each comprise a first belt fastening device substantially in the area of the free ends, a second belt fastening device substantially in the front area of the seat, and a third belt fastening device substantially in the back area of the seat. The belt fastening device may comprise, for example, a mounting bracket which is pivotable about a pin which is fixed in the saddle tree material.

One end of a belt is preferable attachable to the first belt fastening device, the belt is guidable through an opening of a first strap and it is attachable to the third belt fastening device, the belt is guidable from the third belt fastening device through an opening of a second strap and it is attachable to the second belt fastening device. The opening is, for example, a slit or a loop. This preferred belt guide allows a secure and firm attachment of the device, saddle tree and/or saddle to the back of a riding animal or pack animal and provides the rider a secure seat wherein a specific and improved interaction between the rider and the riding animal or pack animal can be achieved.

In a further preferred belt guide, one end of the belt is attachable to a first belt fastening device, the belt is guidable through an opening of a first strap and it is attachable to a third belt fastening device, the belt is then guidable from the third belt fastening device through an opening of a second strap and through a membrane, which is below the saddle tree, above the saddle tree, and the belt is attachable to the second belt fastening device.

At least one cushion element is attachable to the bottom side of the seat. In a preferred embodiment, at least two separately formed cushion elements are attached to the bottom side of a seat. Thus, an improved support for applying to a back of a riding animal or pack animal can be provided and anatomically different body parts can be taken into consideration. Furthermore, an improved belt configuration of the riding animal or pack animal can be achieved.

Advantageously the cushion element comprises a cushion, a filler and a cover. The cushion has a substantially U-shaped cross-sectional shape. The filler is formed between the legs of the U-shaped cushion. A cover, for example a leather cover, surrounds the cushion and the filler. Each cushion element can comprise openings in order to facilitate the attachment of the cushion elements to the saddle tree by means of fastening elements. For example, screws, rivets and/or adhesives can be used as fastening elements.

In a preferred embodiment, the saddle tree which comprises the seat, the front area, the back area and the both side areas, and the link sections of the right and left multi-linked lug arrangements are made from an integral component, i.e. in one piece. The pivoting devices are preferably formed by tapering of material or by connection struts. The material of the saddle tree and the lug arrangements preferably comprise fiber-reinforced plastics. There are also other materials usable which have sufficient strength and flexibility.

BRIEF DESCRIPTION OF THE DRAWINGS

Exemplary embodiments of a seat support device, a saddle tree and a saddle are described with reference to the accompanying drawings, in which.

DETAILED DESCRIPTION

This detailed description teaches various embodiments of the present invention with reference to the accompanying drawings. While so-called English riding saddles are illustrated in the drawings the expert recognizes that the embodiments exemplified below are adaptable to any other type of saddle.

Figure 1:
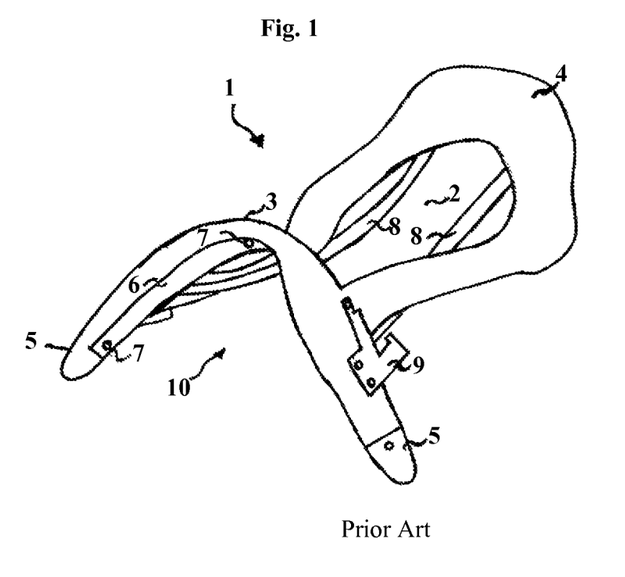
FIG. 1: is a perspective view of a saddle tree of the prior art.

A saddle tree generally comprises of a plurality of components rigidly connected together with glue or in other ways. FIG. 1 shows a saddle tree of the state of the art. The saddle tree 1 comprises a seat 2 extending between a pommel 3, also referred to as saddle head or fork, and a cantle 4. Free ends or wings 5 are formed at the ends of the pommel 3. A gullet plate 6 is arranged and attached to the pommel 3, i.e. the surface facing towards the head of the riding animal or pack animal, by fastening means 7. Two longitudinal springs or bars 8 extend between the gullet plate 6 and the cantle 4. Stirrup belt holders 9 are releasably fastened to the pommel 3, for example by means of riveting or bolting. The saddle tree 1 forms a gullet 10 at its front end 3. The gullet 10 is used to receive the withers of a riding animal or pack animal. In case that the withers of a riding animal or pack animal is formed high and small, the gullet 10 is accordingly shaped high and small. In case that the withers is formed low and wide, the gullet 10 is accordingly shaped low and wide. The width or breadth of the gullet is also referred to as gullet width.

Figure 2:
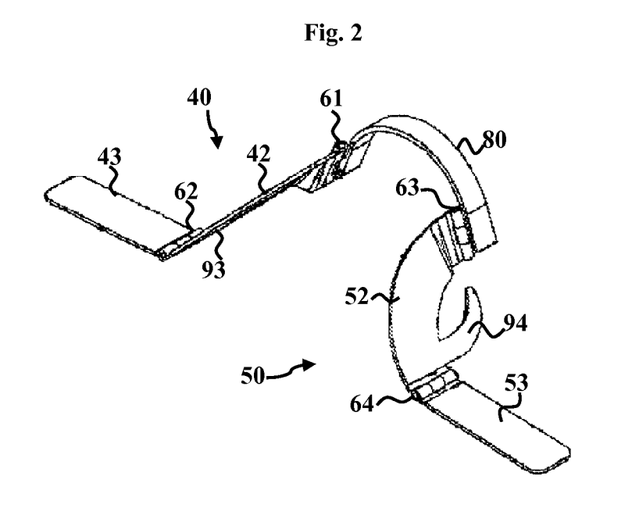
FIG. 2: is a perspective view of a seat support device.

FIG. 2 shows a perspective side view of a novel seat support device. The seat support device can be attached to a saddle support of a riding animal or pack animal. A pivoting device 61 of a right multi-linked lug arrangement 40 and a pivoting device 63 of a left multi-linked lug arrangement 50 are attached to a connection strut 80. The seat support device could also be attached to a saddle support. The second link section 42 of the right multi-linked lug arrangement 40 comprises a stirrup belt holder 93 and the second link section 52 of the left multi-linked lug arrangement 50 comprises a stirrup belt holder 94. A pivoting device 62 is provided between the second link section 42 and the third link section 43 of the right multi-linked lug arrangement 40 and a pivoting device 64 is provided between the second link section 52 and the third link section 53 of the left multi-linked lug arrangement 50. As shown in FIG. 2, the pivoting devices 61, 63 can be attached very close to the connection strut 80. However, it also is possible that link sections are provided between the connection strut 80 and each of the pivoting devices 61, 63.

Figure 3A:
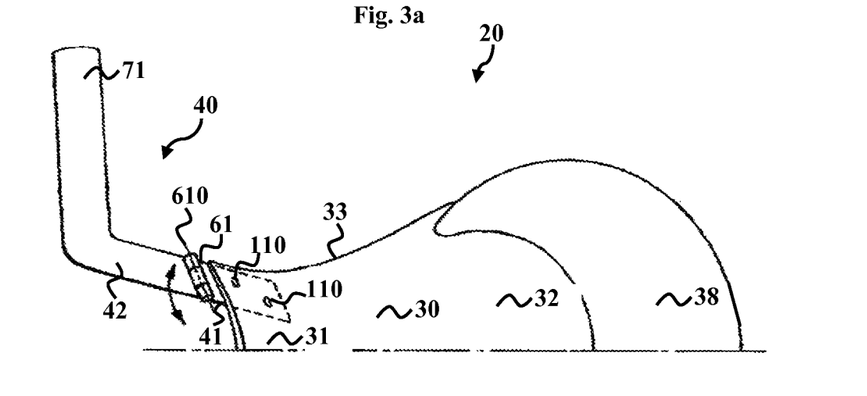
FIG. 3*a* and FIG. 3*b*: are top views of a saddle tree.
Figure 3B:
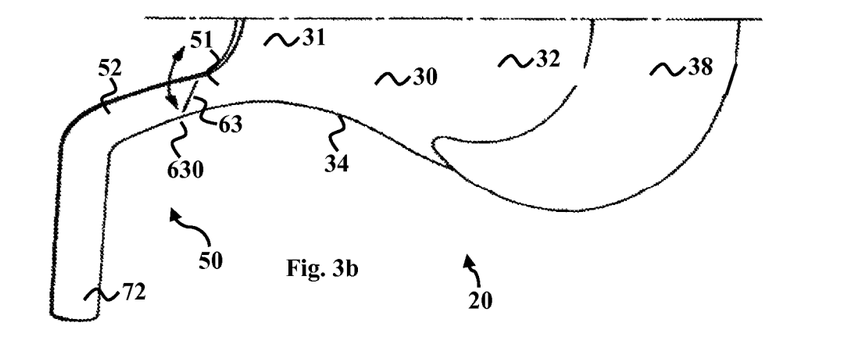

FIGS. 3a and 3b show top views of a seat support device which is attached to a saddle tree 20. The saddle tree 20 for riding animals or pack animals comprises a front area 31 facing towards the head of a riding animal or pack animal, a seat 30, a back area 32 and two side areas 33, 34. A cantle 38 is formed in the back area 32. The side areas 33, 34 of the seat 30 extend from the front area 31 to the back area 32 of the saddle tree 20. A right multi-linked lug arrangement 40 is attached to the front area 31 of the seat 30 substantially at the edge of the right side area 33 and a left multi-linked lug arrangement 50 is attached to the front area 31 of the seat 30 substantially at the edge of the left side area 34. The attachment of the lug arrangement 40 at the edge of the side area 33 is provided by fastening elements 110 such as screws, rivets and/or adhesives, as shown in FIG. 3a. In FIG. 3b, the left multi-linked lug arrangement 50 and the saddle tree 20 are formed from an integral component. The right multi-linked lug arrangement 40 comprises a first link section 41 and a second link section 42. The left multi-linked lug arrangement 50 comprises a first link section 51 and a second link section 52. The second link section 42 of the right multi-linked lug arrangement 40 and the second link section 52 of the left multi-linked lug arrangement 50 comprise free ends 71, 72.

Each lug arrangement 40, 50 advantageously comprises at least one pivoting device. As shown in FIGS. 3a and 3b, a pivoting device 61 with a pivot axis 610 is provided between the link sections 41 and 42 of the right multi-linked lug arrangement 40 and a pivoting device 63 with a pivot axis 630 is provided between the link sections 51 and 52 of the left multi-linked lug arrangement 50. The pivot axis 610, 630 of the pivoting devices 61, 63 substantially lie in a plane which penetrates the longitudinal axis of the saddle tree 20 substantially perpendicular. In FIG. 3a, the pivoting device 61 is, for example, a hinge, and in FIG. 3b, the pivoting device 63 is an integral hinge, i.e. it can be formed by means of tapering of material. As shown FIG. 3b, the saddle tree and the lug arrangements can be formed from an integral component. Each pivoting device 61, 63 provides a degree of freedom substantially around its pivot axis. Both the lug arrangement 40 and the lug arrangement 50 enable a pivoting whereby an improved adaption of the saddle tree 20 to the back of a riding animal or pack animal, in particular regardless of the configuration and form of the withers and the shoulder areas of the riding animal and pack animal, and a secure fixation of the saddle tree 20 to the back of the riding animal or pack animal can be achieved. The pivoting directions are illustrated in FIGS. 3a and 3b by means of arrows P. As shown in FIG. 3b, the two adjacent link sections 51 and 52 are pivotable towards one other around the pivot axis 630 substantially within a pivot plane which penetrates the pivot axis 630 substantially perpendicular. The term "substantially perpendicular" here preferably comprises a taper angle range of 20°.

The saddle tree 20 does not comprise a gullet plate and/or a saddle head. The saddle tree 20 can be made from any material that is suitable particularly to withstand loads of the tensile forces of a belt configuration and force components and torsion components that occur during movements between the rider and the riding animal or pack animal. For example, plastic compounds such as fiber-reinforced or carbon-fiber-reinforced plastics or wooden constructions with or without a spring metal edging but also other materials can be used. The lug arrangements 40, 50 can be made from any material that is suitable particularly to withstand loads of the tensile forces of a belt configuration and force components and torsion components that occur during movements between the rider and the riding animal or pack animal. The lug arrangements 40, 50, may, for example, comprise a metal, a metal alloy, fiber-reinforced or carbon-fiber-reinforced plastics or the like.

Figure 3C:
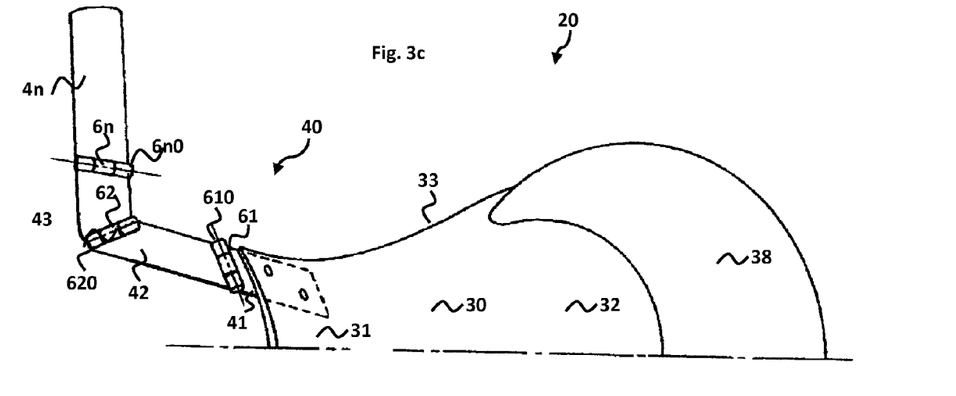
FIG. 3*c* and FIG. 3*d*: are top views of a saddle tree showing a further link section.
Figure 3D:
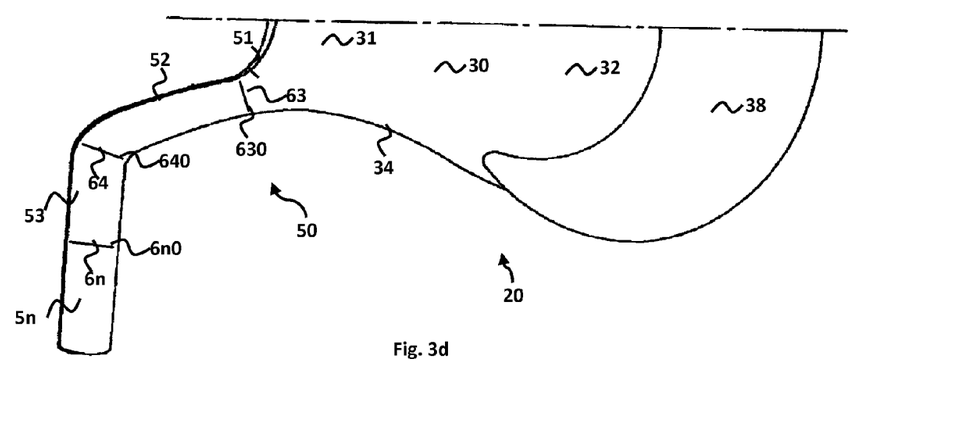

FIGS. 3c and 3d show top views of a seat support device similar to that in FIGS. 3a and 3b. The right multi-linked lug arrangement (40) has a further link section (4n) and the left multi-linked lug arrangement (50) has a further link section (5n). A further pivoting device (6n) with a pivot axis (6n0) is formed in each case between two adjacent link sections (43, 4n, 53, 5n). The two adjacent link sections (43, 4n, 53, 5n) are pivotable towards one other around the pivot axis (6n0) substantially within a pivot plane (300) which penetrates the pivot axis (6n0) substantially perpendicular.

Figure 4:
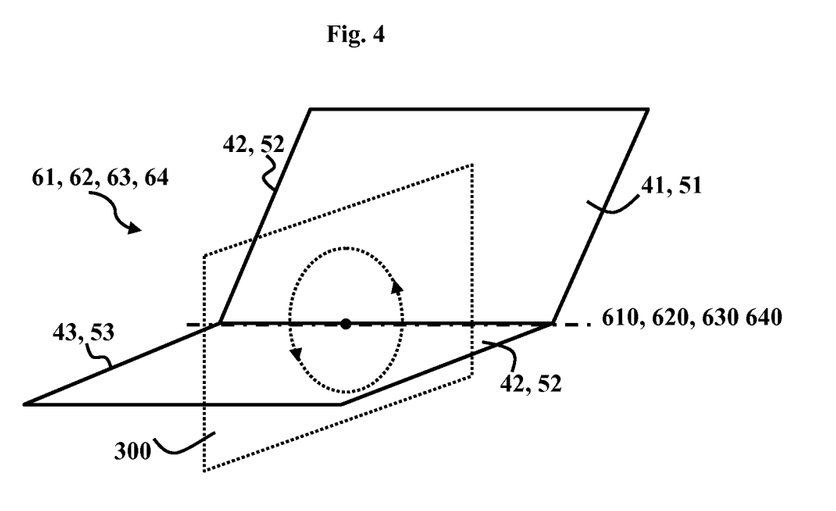
FIG. 4: is a schematic illustration of a pivoting device.

FIG. 4 shows a schematic view which explains the principle of the pivoting devices. A pivoting device 61; 62; 63; 64 is formed between two adjacent link sections 41, 42; 51, 52; 42, 43; 52, 53. The pivoting device 61; 62; 63; 64 comprises a pivot axis 610; 630; 620; 640. The pivot axis 610; 630; 620; 640 of two adjacent link sections 41, 42; 51, 52; 42, 43; 52, 53 is pivotable towards one other around substantially within a pivot plane 300 which penetrates the pivot axis 610; 630; 620; 640 substantially perpendicular. Thus, on the one hand a preferred flexibility of the saddle tree can be achieved; on the other hand the required stability is maintained by the fixation of the rotation plane. The term "substantially perpendicular" preferably comprises a taper angle range of 20°.

Figure 5:
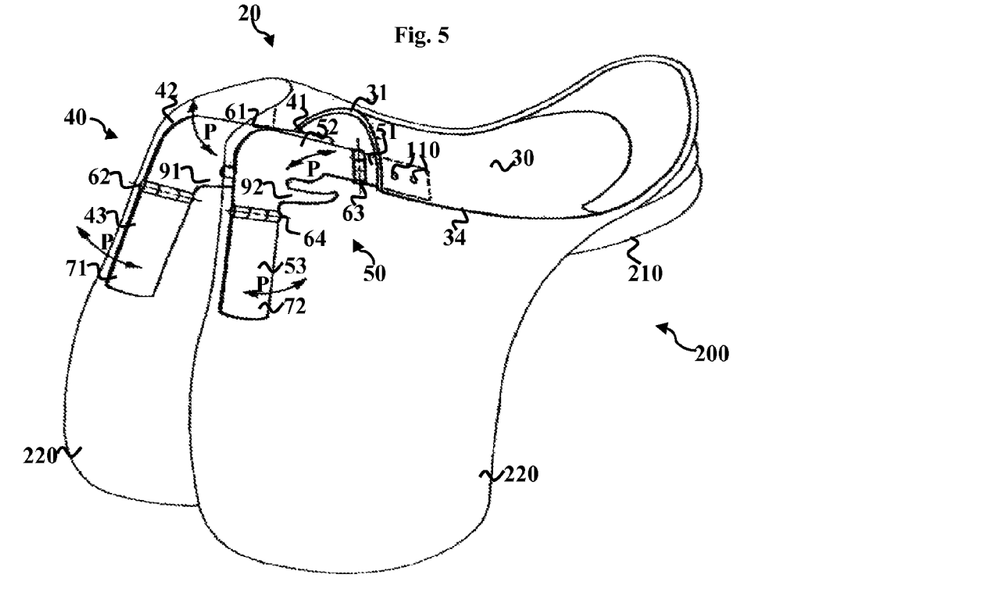
FIG. 5: is a perspective view of an alternative seat support device within a saddle.

FIG. 5 shows an alternative seat support device within a saddle 200. The same features or components are indicated with the same reference numbers. A saddle tree 20 and parts of a preferred saddle 200 are depicted in FIG. 5. The third link section 43 of the right multi-linked lug arrangement 40 and the third link section 53 of the left multi-linked lug arrangement 50 comprise pivotable free ends 71, 72. The end of the first link section 41 of the right multi-linked lug arrangement 40 is attached substantially at the edge of the right side area and the end of the first link section 51 of the left multi-linked lug arrangement 50 is attached substantially at the edge of the left side area 34 by fastening elements 110. A first stirrup belt holder 91 or a first stirrup bar is provided between the first link section 41 and the second link section 42 of the right multi-linked lug arrangement 40 and a second stirrup belt holder 92 or a second stirrup bar is provided between the first link section 51 and the second link section 52 of the left multi-linked lug arrangement 50. The stirrup belt holder 91, 92 is a safety hook in which the stirrup belts can be hooked in. As shown in FIG. 5, the second link section 42 and the first stirrup belt holder 91 and the second link section 52 and the second stirrup belt holder 92 are each made from an integral component. Thus, a particularly efficient construction can be provided without the need of further separate components or fastening elements. A pivoting device 61, 62 is each formed between the first link section 41 and the second-link section 42 and between the second link section 42 and the third link section 43 of the right multi-linked lug arrangement 40. A pivoting device 63, 64 is also each formed between the first link section 51 and the second link section 52 and between the second link section 52 and the third link section 53 of the left-multi-linked lug arrangement 50. The pivoting devices 61, 62, 63, 64 allow a pivoting of the link sections of the lug arrangements 40, 50 so that an optimal adaption of the multi-linked lug arrangements to the back of a riding animal or pack animal can be achieved. The pivoting directions are illustrated by arrows P. In a preferred embodiment, the saddle tree 20 can have a recess (not depicted) in the front area 31 of the seat 30. The expert recognizes that the link sections can have any length. In particular, the first link sections 41, 51 can be shorter than the second link sections 42, 52 and/or the third link sections 43, 53. A cushion element 210 is attached to the surface of the saddle tree facing towards the back of the riding animal or pack animal. In a preferred embodiment, the pivoting devices 61, 63 are provided close to the front area 31 of the seat 30.

It is preferred that two separate cushion elements 210 are attached to the saddle tree 20 (not depicted in FIG. 5). FIG. 5 shows a lower saddle flap 220. The saddle tree 20 can further comprise, for example, at least one connection strut between the first link section 41 of the right-multi-linked lug arrangement 40 and the first link section 51 of the left multi-linked lug arrangement 50 which, however, is not shown in FIG. 5.

Figure 6:
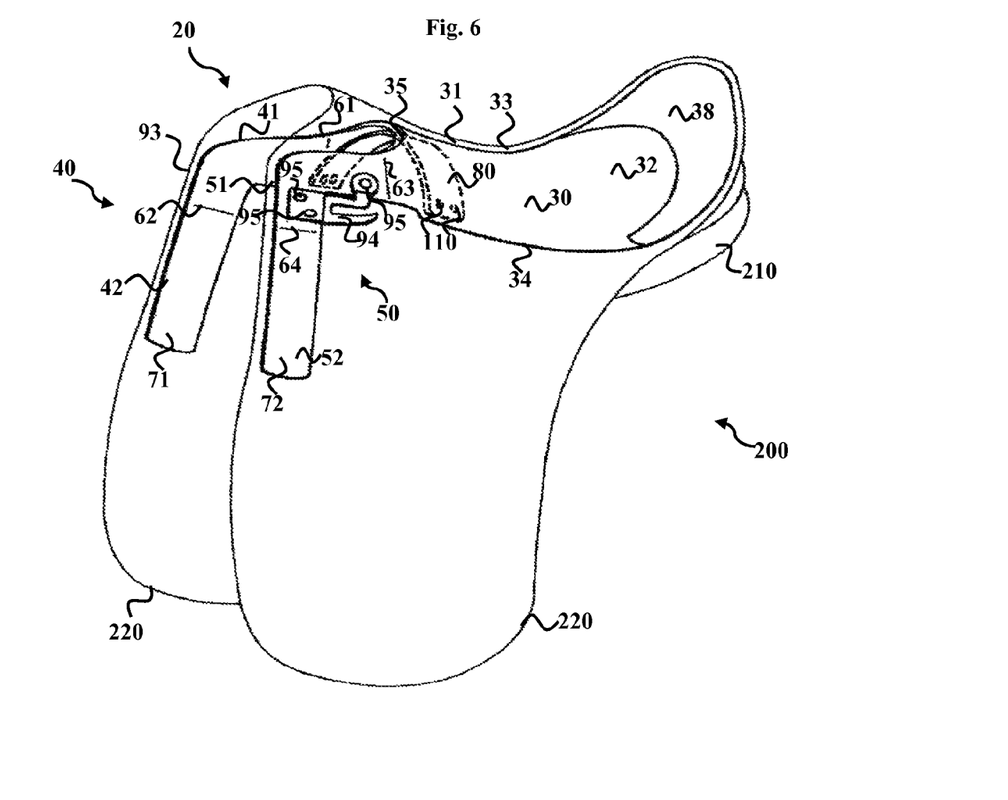
FIG. 6: is a perspective side view of yet another seat support device within a saddle.

FIG. 6 is a perspective side view of yet another seat support device within a saddle. The same features or components are indicated with the same reference numbers. A saddle tree 20 and parts of a saddle 200 are depicted in FIG. 6. The saddle tree 20 comprises a seat 30, a front area 31, a back area 32 with a cantle 38 and two side areas 33, 34. A pivoting device 61, 62 is each formed between the first link section 41 and the second link section 42 and between the second link section 42 and the third link section 43 of the right multi-linked lug arrangement 40. Further, a pivoting device 63, 64 is each formed between the first link section 51 and the second link section 52 and between the second link section 52 and the third link section 53 of the left multi-linked lug arrangement 50. The pivoting devices 61, 62, 63, 64 are formed by tapering of material. The expert recognizes that the pivoting devices 61, 62, 63, 64 can also comprise a hinge or a joint. The saddle tree 20 has a recess 35 in the front area 31 of the seat 30 in order to provide an improved movability of the back musculature and a protection to the back of the riding animal or pack animal. The end of the link section 41 of the right lug arrangement 40 is attached substantially to the edge of the side area 33 and the end of the link section 51 of the left lug arrangement 50 is attached substantially to the edge of the side area 34 fastening elements. Screws, rivets and/or adhesives are used, for example, as fastening elements. The ends of the link sections 41, 51 of the lug arrangements 40, 50 are connected with a connection strut 80 by fastening elements 110 such as screws, rivets, welding or the like. The connection strut 80 is bent and has substantially the shape or curvature of the saddle tree 20. The connection strut 80 is formed behind the recess 35. In a further preferred embodiment, the connection strut 80 and the lug arrangements 40, 50 are made from an integral component (not depicted in FIG. 6). A first stirrup belt holder 93 (is not depicted in FIG. 6) is attached to the right multi-linked lug arrangement 40 and a second stirrup belt holder 94 is attached to the left multi-linked lug arrangement 50 by fastening means 95. Particularly, there is not shown in FIG. 6 a seat support formed above the seat or an upper saddle flap. FIG. 6 depicts a lower saddle flap 220 and the at least one cushion element 210.

Figure 7:
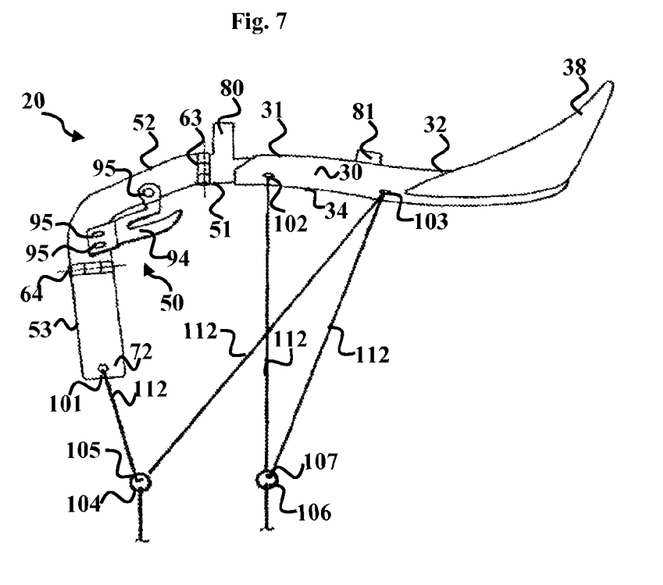
FIG. 7: is a schematic side view of seat support device having a first belt configuration.

FIG. 7 is a schematic side view of a first belt configuration. The same features or components are indicated with the same reference numbers. FIG. 7 shows the saddle tree 20 to which the left multi-linked lug arrangement 50 is attached. The cantle 38 is formed at the back area 32 of the seat 30. A pivoting device 63, 64 is each formed between the first link section 51 and the second link section 52 and between the second link section 52 and the third link section 53 of the left multi-linked lug arrangement 50. The pivoting devices 63, 64 are hinges. In a further preferred embodiment, the pivoting devices 63, 64 can also be provided by tapering of material. The stirrup belt holder 94 is mounted to the lug arrangement 50 by fastening means 95. A first belt fastening device 101 is formed in the link section 53 in the area of the free end 72. A second belt fastening device 102 is substantially formed in the front area 31 of the side area 34 and a third belt fastening device 103 is substantially formed in the back area 32 of the side area 34. One end of a belt 112 is attached to the first fastening device 101. The belt 112 is guided through an opening 105 of a first strap 104 and is attached to the third belt fastening device 103. The belt is then guided from the third belt fastening device 103 through an opening 107 of a second strap 106 and is attached to the second belt fastening device 102. The same belt which has been guided from the first belt fastening device 101 to the third belt fastening device 103 can be continued after attachment to the back area 32 of the side area 34. Alternatively, the belt can be guided from the first fastening device 101 to the third belt fastening device 103 and another belt can be guided from the third belt fastening device 103 to the second belt fastening device 102. The opening 105 may, for example, be configured slit-like or round. The indicated positions of the belt fastening devices 102 and 103 are examples. The two belt fastening devices 102 and 103 are located substantially at the edge of the side area 34.

In FIGS. 2 to 6, the belt fastening devices 101, 102, 103 are not illustrated. The expert recognizes that these embodiments have a corresponding belt configuration.

Figure 8:
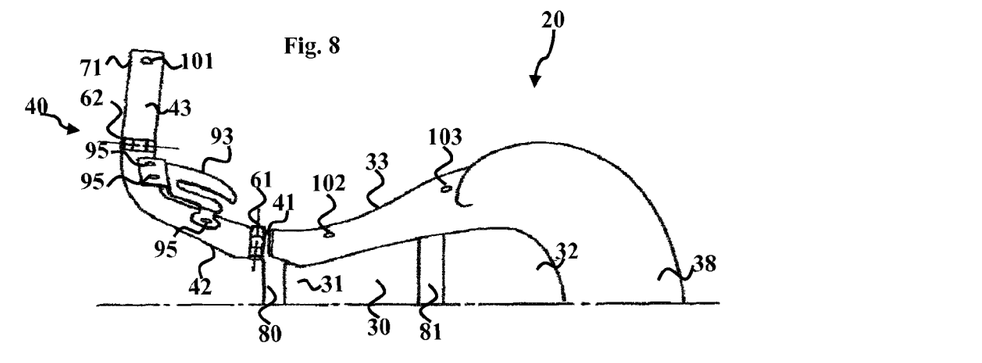
FIG. 8: is a schematic partial top view of a seat support device.

FIG. 8 is schematic partial top view of a further seat support device. The same features or components are indicated with the same reference numbers. FIG. 8 shows one half of the saddle tree 20 to which the right multi-linked lug arrangement 40 is attached. The seat 30 comprises a cantle 38 in the back area 32. A pivoting device 61, 62 is each formed between the first link section 41 and the second link section 42 and between the second link section 42 and the third link section 43 of the right multi-linked lug arrangement 40. The pivoting devices 61, 62 are hinges. In a preferred embodiment, the pivoting devices 61, 62 can comprise integral hinges or integral joints formed by a tapering of material. The stirrup belt holder 93 is attached to the lug arrangement 40 by fastening means 95. A first belt fastening device 101 is formed in the third link section 43 in the area of the free end 71. A second belt fastening device 102 is substantially formed in the front area 31 of the side area 33 and a third belt fastening device 103 is substantially formed in the back area 32 of the side area 33. The positions of the belt fastening devices 102 and 103 indicated in FIG. 8 are examples. The two belt fastening devices 102 and 103 are substantially located at the edge of the side area 33. Two connection struts 80, 81 are formed between the right lug arrangement 40 and the left lug arrangement 50 (not shown in FIG. 8). The first connection strut 80 is substantially formed in the front area 31 and the second connection strut 81 is substantially formed in the middle or back area 32 of the seat 30.

Figure 9:
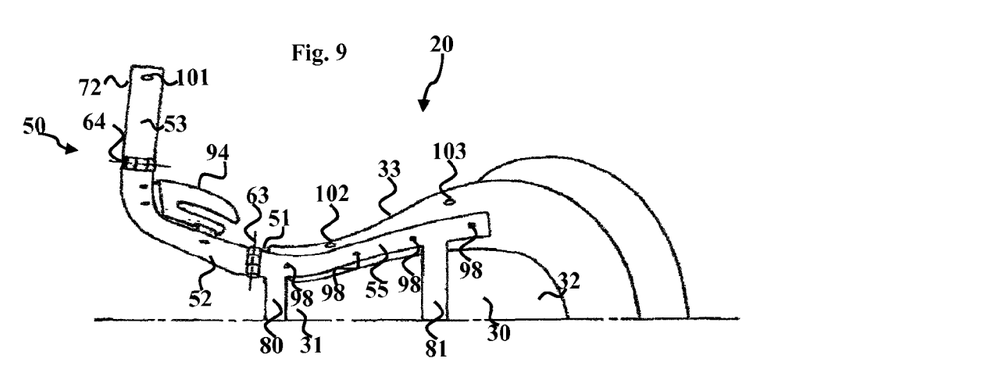
FIG. 9: is a schematic partial bottom view of a seat support device.

FIG. 9 is a schematic partial bottom view of a seat support device. It shows one half of the saddle tree 20 when viewed from below. In FIG. 9, the saddle tree 20 and the left multi-linked lug arrangement 50 are shown. The left multi-linked lug arrangement 50 comprises the first link section 51, the second link section 52 and the third link section 53. The stirrup belt holder 94 is attached to the lug arrangement 50 by fastening means 95. A pivoting device 63, 64 is each formed between the first link section 51 and the second link section 52 and between the second link section 52 and the third link section 53 of the left multi-linked lug arrangement 50. The pivoting devices 63, 64 are hinges or joints. The expert recognizes that the pivoting devices 63, 64 can be formed by tapering of material. The first link section 51 of the left multi-linked lug arrangement 50 is at least partly formed to the back area 32 of the seat 30. The first link section 41 of the right multi-linked lug arrangement 40, which is not depicted in FIG. 9, is also at least partly formed to the back area 32 of the seat 30. The first link section 41 and the first link section 51 form extended longitudinal struts 55. The longitudinal struts are attached to the saddle tree 20 by fastening means 98. Two connection struts 80, 81 are formed between the right lug arrangement 40 (which is not depicted in FIG. 9) and the left lug arrangement 50. The first connection strut 80 is substantially located at the front area 31 and the second connection strut 81 is substantially located at the middle or back area 32. The two connection struts 80, 81 have a curvature. The longitudinal struts 55 and the connection struts 80, 81 can be made from an integral component. A first belt fastening device 101 is formed in the third link section 53 in the area of the free end 72. A second belt fastening device 102 is substantially formed in the front area 31 of the side area 33 and a third belt fastening device 103 is substantially formed in the back area 32 of the side area 33. In a preferred embodiment which is not depicted, the links of the lug arrangements, the longitudinal struts and the connecting struts are made from an integral component and the pivoting devices are formed by tapering of material.

Figure 10:
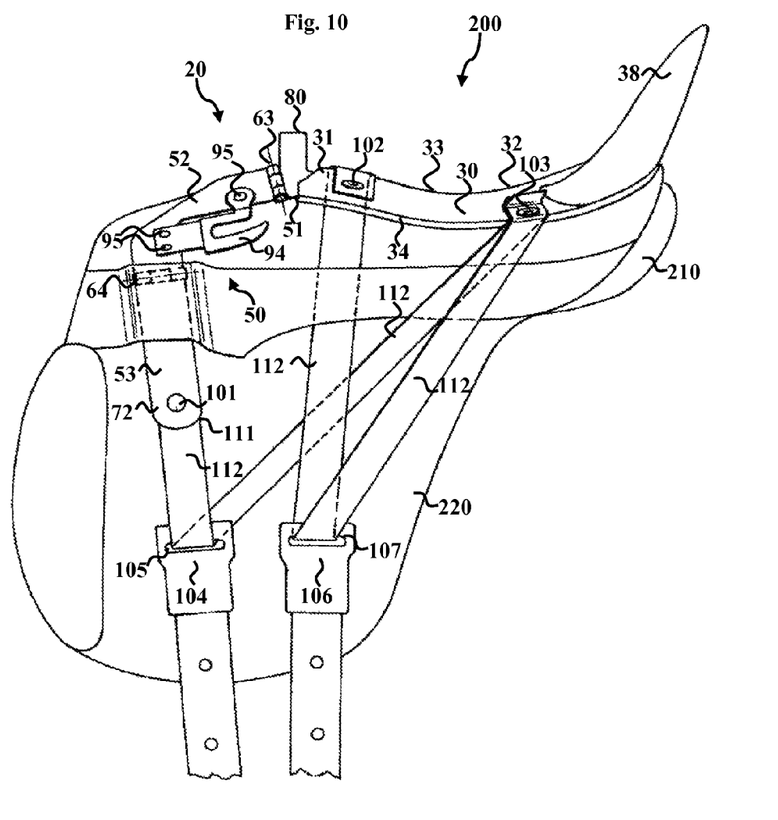
FIG. 10: is a schematic side view of a saddle showing a second belt configuration.

FIG. 10 is a perspective side of a saddle showing a second belt configuration. The same features and components are indicated with the same reference numbers. FIG. 10 shows a saddle 200 with a saddle tree 20. The saddle tree 20 comprises the seat 30, the front area 31, the back area 32 with the cantle 38 and the side areas 33, 34. The pivoting device 63 is formed between the first link section 51 and the second link section 52 and the pivoting device 64 is formed between the second link section 52 and the third link section 53 of the left multi-linked lug arrangement 50. The pivoting devices 63, 64 are hinges. In a further preferred embodiment, the pivoting devices 63, 64 can be formed by tapering of material. The stirrup belt holder 94 is attached to the lug arrangement 50 by fastening means 95. A first belt fastening device 101 is attached to the link section 53 in the area of the free end 72. A second belt fastening device 102 is substantially attached to the front area 31 of the side area 34 and the third belt fastening device 103 is substantially attached to the back area 32 of the side area 34. One end 111 of the belt 112 is attachable to the first belt fastening device 101, the belt is guidable through an opening 105 of a first strap 104 and is attachable to the third belt fastening device 103. The belt 112 is then guidable from the third belt fastening device 103 through an opening 107 of a second strap 106 and through a membrane of the saddle tree 20 and is attachable to the second belt fastening device 102.

In an alternative belt fastening, one end 111 of the belt 112 is attached to the first belt fastening device 101. The belt 112 is guided through an opening 105 of a first strap 104 and is attached to the third belt fastening device 103. The belt 112 is then guided from the third belt fastening device 103 through an opening 107 of a second strap 106 and is attached to the second belt fastening device 102.

The belt configuration can be provided by the same belt 112. Alternatively, a belt 112 can be used for the connection from the first belt fastening device 101 to the third belt fastening device 103 and a separate belt can be used for the connection from the third belt fastening device 103 to the second belt fastening device 102. The openings 105, 107 are slit-like. The expert recognizes that another belt configuration from the first belt fastening device 101 to the second belt fastening device 102 and from the second belt fastening device 102 to the third belt fastening device 103 is possible.

The positions of the belt fastening devices 102 and 103 depicted in FIG. 10 are substantially located at the edge of the side area 34. A seat support formed above the seat is not depicted in FIG. 10. The saddle 200 comprises at least one cushion element 210 and a lower saddle flap 220. Preferably, the attachment of the saddle 200 behind the scapulae of the riding animal or pack animal is provided flexible by the tension of the belt configuration.

Figure 11:
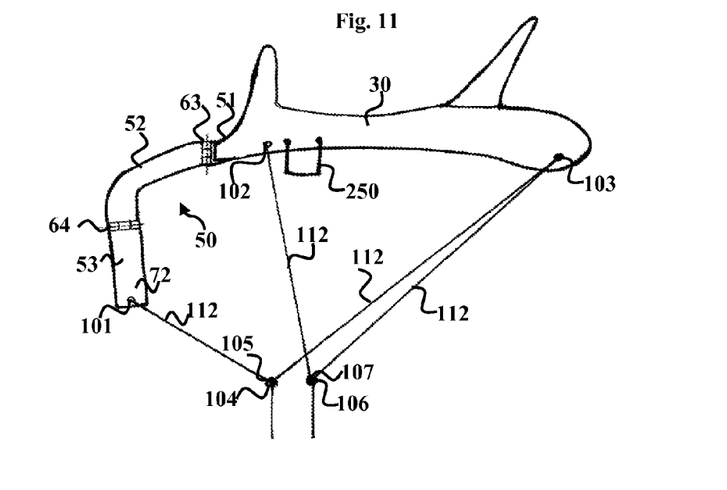
FIG. 11: shows an exemplary Bock saddle with a seat support device.

FIG. 11 shows an exemplary Bock saddle with a seat support device. The same features or components are indicated with the same reference numbers. In FIG. 11, a Bock saddle 200 is depicted to which a seat support device is attached. The Bock saddle has a longer support area or seat 30 compared to, for example, a dressage saddle. A saddle head and/or a gullet plate are not provided. A stirrup belt holder 250 is attached to the seat 30. The expert recognizes that the inventive device can be attached to different types of saddles.

Figure 12:
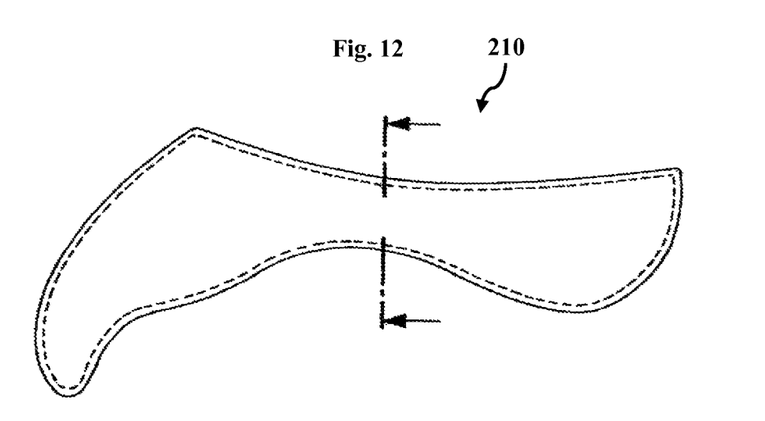
FIGS. 12 to 14: show various cushion elements.
Figure 13:
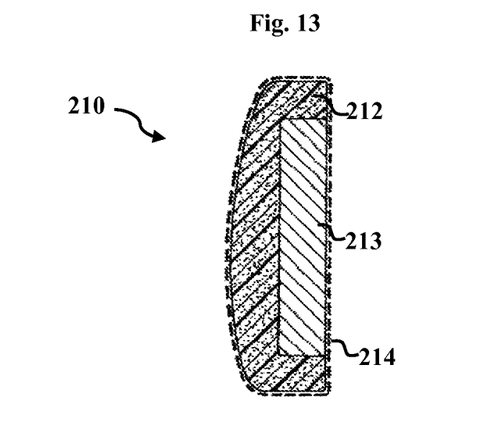
Figure 14:
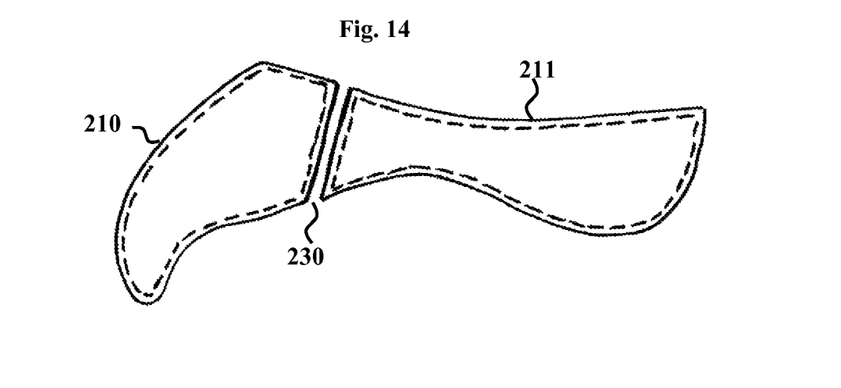
Figure 15:
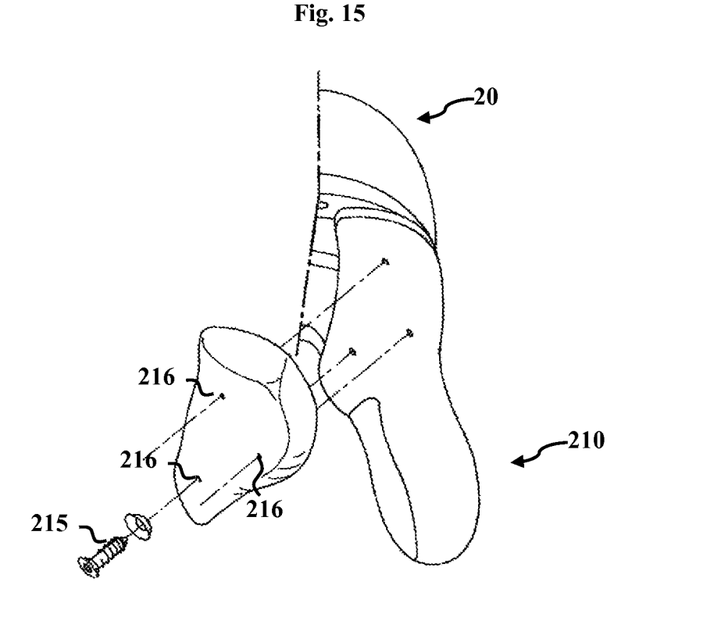
FIGS. 15 to 18: illustrate mounting options of at least one cushion element.
Figure 16:
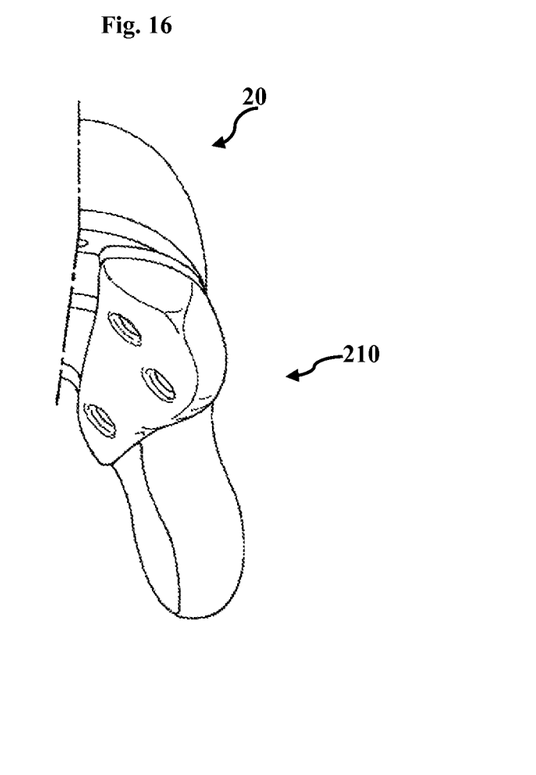

A cushion element 210 or a pillion which is attachable to the undersurface of the saddle tree is depicted in FIGS. 12 to 14. The undersurface of the saddle tree refers to the side which faces the horse back of the riding animal or pack animal. The cushion element 210 comprises a cushion 212 or a pillow. As shown in FIG. 13, the cushion 212 has substantially a U-shape in cross-sectional view. A filler 213 is formed between the legs of the cushion 212. The cushion 212 and the filler 213 are surrounded by a cover 214 such as a leather cover. The filler 213 and the cushion 212 are made from a material which enables that the cover 214 can be attached. For example, the filler 213 comprises felt or cotton to which a leather cover can be attached. Two cushion elements 210 are preferably attached to a saddle tree wherein one cushion element 210 is substantially disposed on the left side of the withers of a riding animal or pack animal and another cushion element 210 is substantially disposed on the right side of the withers of a riding animal or pack animal. An improved support of the saddle tree and the saddle on the back of a riding animal or pack animal can be achieved by providing two cushion elements.

In a preferred embodiment, four separate cushion elements 210, 211 are attachable to the saddle tree. For example, FIG. 14 shows two cushion elements 210, 211, which are attachable to one side of the saddle tree and another pair of cushion elements which are attachable to the other side of the saddle tree. In a further embodiment, the cushion element 210 which is depicted in FIG. 14 can comprise an expansion joint indicated in FIG. 14 with the reference sign 230.

Preferred fastening devices of the at least one cushion element 210 are shown in FIGS. 15 to 18. The at least one cushion element 210 can be attached to the saddle tree 20 by means of fastening elements 215 such as screws and by riveting. For example, in FIGS. 15 and 16, a screw 215 is shown. Openings 216 can be formed in the at least one cushion element 210 in order to facilitate the attachment.

Figure 17:
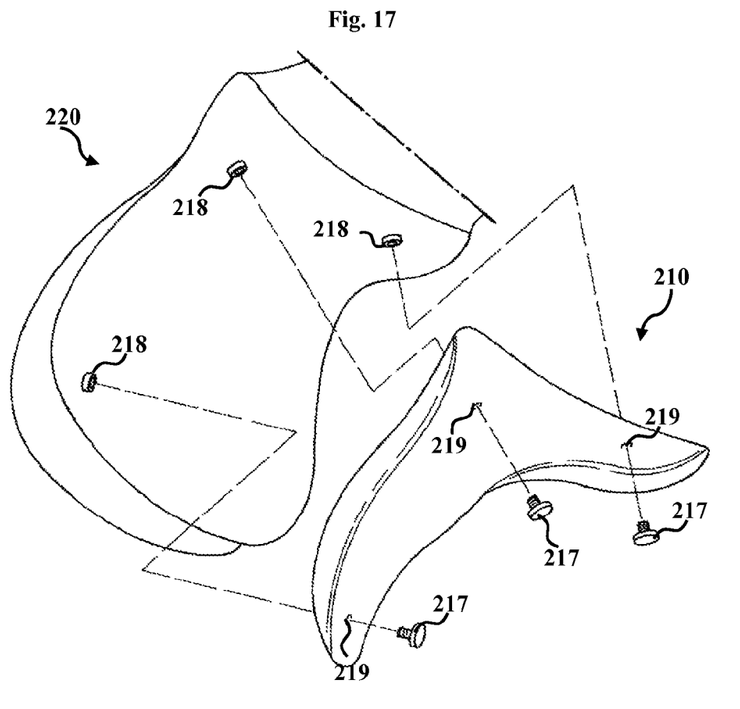
Figure 18:
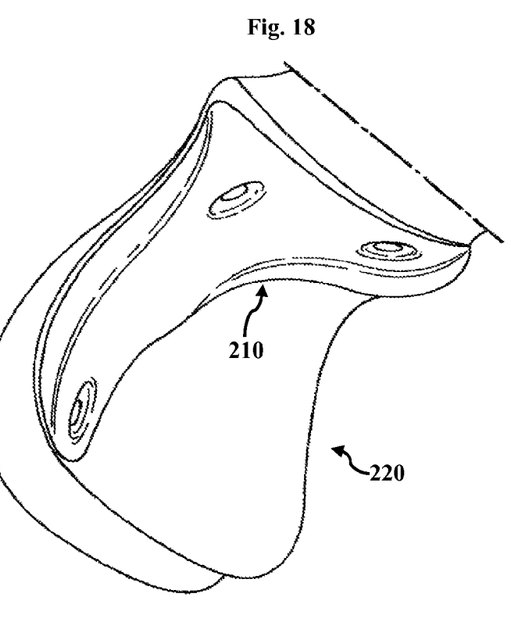

Alternative fastening elements are shown in FIGS. 17 and 18. The at least one cushion element 210 is attachable to the lower saddle flap 220 by means of press stud elements 217, 218. The press stud elements 217, 218 are fastening elements which comprise two parts wherein one part 218 has a deepening and the other part 217 has the corresponding head. For fastening both parts are pressed together. To facilitate the attachment, the at least one cushion element 210 can have openings 219. The parts 218 with the deepening can be attached, for example, to the lower saddle flap 220 and the parts 217 with the proper head can be guided through the openings 219 and can be pressed together with the parts 218.

The expert recognizes that combinations of preferred embodiments are possible. For example, the left multi-linked lug arrangement can comprise a hinge and a tapering of material as a pivoting device and the right multi-linked lug arrangement can comprise a hinge and a tapering of material. Furthermore, two or more connection struts can be formed between the first link sections of the lug arrangements. In the exemplary figures, one or two pivoting devices per lug arrangement have been described. Three or more pivoting devices can also be provided between the respective link sections of the lug arrangements. Particularly, the so-called English riding saddle is shown in the figures in preferred embodiments. The expert recognizes that the inventive device can be attached to other types of saddles such as pack saddles, Western saddles with or without a horn, stock saddles with or without a horn, saddles without saddle trees, trekking saddles, endurance saddles, baroque saddles, Iberian saddles, trail saddles or side saddles.

What is claimed is:

1. A seat support device for a riding animal or a pack animal, comprising:
    a right multi-linked lug arrangement (40); and
    a left multi-linked lug arrangement (50),
    each comprising
        a first link section (41, 51) pivotally connected to a second link section (42, 52) by a first pivoting device (61, 63), the first pivoting device (61, 63) having a first pivot axis (610, 630) allowing the first link section (41, 51) and the second link section (42, 52) to pivot towards each other within a first pivot plane which penetrates the first pivot axis (610, 630) substantially perpendicular, and
        a third link section (43, 53) pivotally connected to the second link section (42, 52) by a second pivoting device (62, 64) having a second pivot axis (620, 640) allowing the second link section (42, 52) and the third link section (43, 53) to pivot towards each other within a second pivot plane which penetrates the second pivot axis (620, 640) substantially perpendicular.

2. Device according to claim 1, wherein the right multi-linked lug arrangement (40) has a further link section (4n) and the left multi-linked lug arrangement (50) has a further link section (5n), wherein a further pivoting device (6n) with a pivot axis (6n0) is formed in each case between two adjacent link sections (43, 4n, 53, 5n), the two adjacent link sections (43, 4n, 53, 5n) are pivotable towards one other around the pivot axis (6n0) substantially within a pivot plane (300) which penetrates the pivot axis (6n0) substantially perpendicular.

3. The seat support device as in claim 1, wherein the first pivoting device (61, 63) comprises a hinge or a joint.

4. The seat support device as in claim 1, wherein the first pivoting device (61, 63) is formed by tapering of material.

5. The seat support device as in claim 1, wherein the first pivoting device (61, 63) is formed by a partly flexible tissue element.

6. The device as in claim 1, wherein the third link section (43, 53) comprises a free end (71, 72).

7. The seat support device as in claim 1, wherein the seat support device is connected to a seat having a front area and a back area, and wherein the first link section (41, 51) extends at least partly towards the back area of the seat.

8. The seat support device as in claim 1, further comprising a connection element (80) between the first link section (41) of the right multi-linked lug arrangement (40) and the first link section (51) of the left multi-linked lug arrangement (50).

9. The seat support device as in claim 1, wherein the right multi-linked lug arrangement (40) and the left multi-linked lug arrangement (50) each comprise a stirrup belt holder (91, 92).

10. The seat support device as in claim 9, wherein the stirrup belt holder (93, 94) is attached to the first link section (41, 51) or the second link section (42, 52) by fastening means (95).

11. The seat support device as in claim 6 connected to a seat having a front area and a back area, wherein the right multi-linked lug arrangement (40) and the left multi-linked lug arrangement (50) each further comprise:
    a first belt fastening device (101) in an area of the free end (71, 72);
    a second belt fastening device (102) in the front area of the seat; and
    a third belt fastening device (103) in the back area of the seat.

12. The seat support device as in claim 11, wherein an end (111) of a belt (112) is attachable to the first belt fastening device (101), the belt (112) is guidable through an opening (105) of a first strap (104) and is attachable to the third belt fastening device (103), the belt (112) is guidable from the third belt fastening device (103) through an opening (107) of a second strap (106) and is attachable to the second belt fastening device (102).

13. The seat support device as in claim 1, wherein the device does not comprise a saddle head and/or a gullet plate.

14. A saddle tree (20) suitable for a riding animal or a pack animal comprising:
    a seat (30) having a front area, a back area (32), and two side areas (33, 34); and
    a seat support device as in claim 1 attached to the saddle tree (20).

15. The saddle tree (20) as in claim 14, further comprising a recess (35) in the front area (31) of the seat (30).

16. A saddle (200) supported on the back of a riding animal or a pack animal comprising:
    the seat support device as in claim 1;
    a seat (30) having a bottom facing the riding animal or pack animal; and
    at least one cushion element (210) attached to the bottom of the seat (30).

17. The saddle (200) is in claim 16, wherein two separately formed cushion elements (210, 211) are attachable to the bottom of the seat (30).

18. The saddle (200) as in claim 16, wherein the at least one cushion element (210) comprises a cushion (212), a filler (213), and a cover (214).

19. The saddle (200) as in claim 16, wherein the at least one cushion element (210) is attached to the saddle tree (20) by fastening means (215).

20. The saddle (200) as in claim 16, further comprising a saddle tree (20).

\* \* \* \* \*

UNITED STATES PATENT AND TRADEMARK OFFICE
CERTIFICATE OF CORRECTION

PATENT NO. : 8,997,444 B2  Page 1 of 1
APPLICATION NO. : 13/769290
DATED : April 7, 2015
INVENTOR(S) : Konzet et al.

It is certified that error appears in the above-identified patent and that said Letters Patent is hereby corrected as shown below:

(71) of the title page the Applicant's address should be changed from "Weyam" to "Weyarn".

Signed and Sealed this
Nineteenth Day of January, 2016

Michelle K. Lee
*Director of the United States Patent and Trademark Office*